United States Patent Office 3,284,424
Patented Nov. 8, 1966

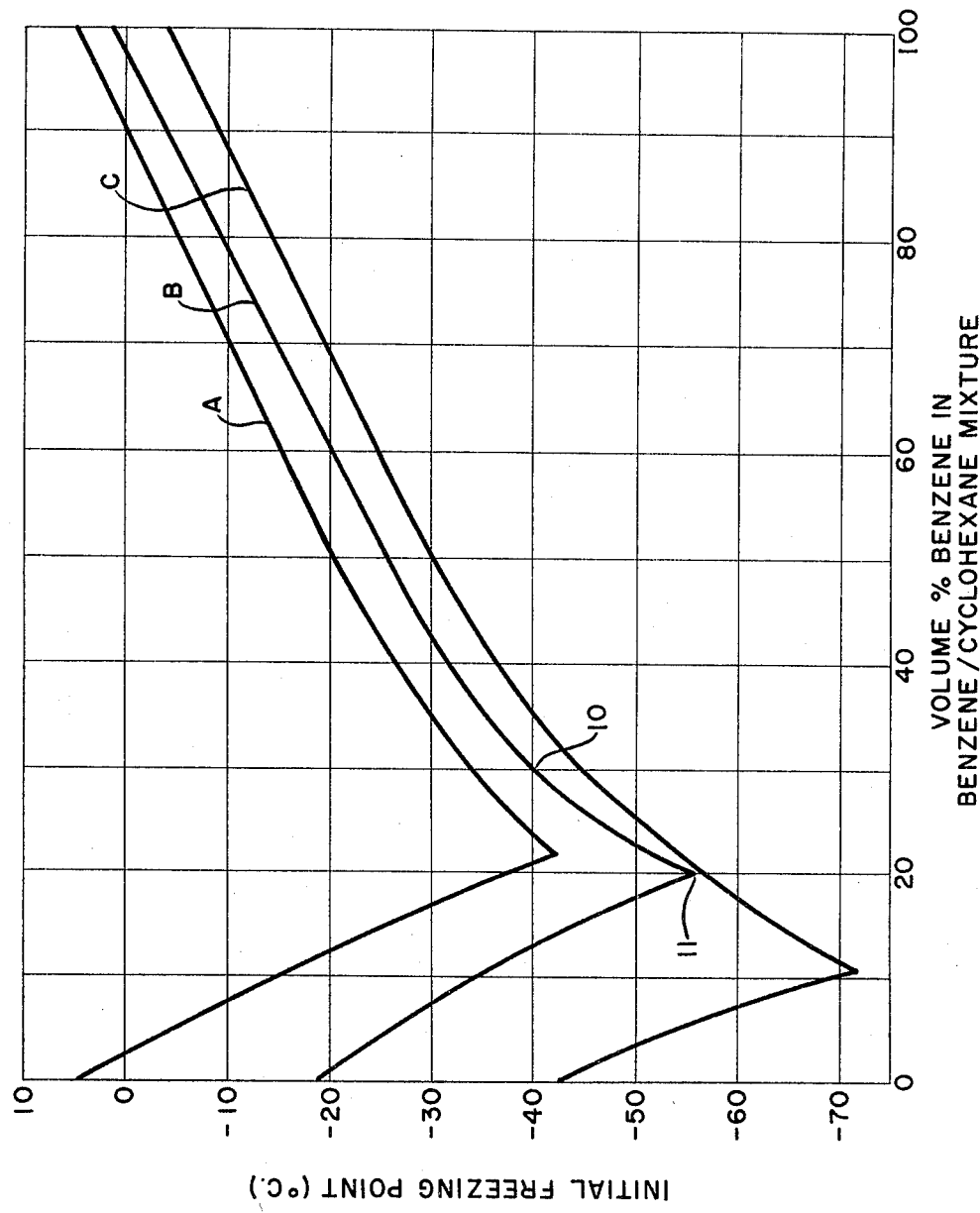

3,284,424
PROCESS FOR PREPARING A COPOLYMER OF ETHYLENE AND 1,4-HEXADIENE
Hans Karl Frensdorff, Wilmington, and Edward Karcher Gladding, New Castle, Del., assignors to E. I. du Pont de Nemours and Company, Wilmington, Del., a corporation of Delaware
Filed Aug. 13, 1963, Ser. No. 301,839
4 Claims. (Cl. 260—88.2)

This invention relates to the prepartion of ethylene copolymers and, more particularly, it relates to an improvement in the preparation of copolymers from ethylene and 1,4-hexadiene.

Sulfur-curable elastomeric hydrocarbon copolymers of ethylene are of increasing importance today in a wide variety of applications. Valuable products of this type are the copolymers of ethylene and 1,4-hexadiene, especially the copolymers having a high proportion of diene monomer units, e.g., 3 gram-moles or more per kilogram of copolymer. These highly unsaturated copolymers are not only outstanding elastomers in their own right, but they are valuable intermediates for the prepartion of adhesives and yield very useful products when blended with other rubbers.

These ethylene/1,4-hexadiene copolymers are prepared according to the general procedures outlined in U.S. Patent 2,933,480 using the so-called coordination catalysts, that is, catalysts made by mixing a Group I, II or III organometallic compound such as a dialkyl aluminum chloride with a reducible transition metal compound such as vanadium tris (acetylacetonate). It is sometimes desired to make these ethylene/1,4-hexadiene copolymers at low reaction temperatures, i.e., below about 15° C., preferably near 0° C. or even as low as −20° C. The feed streams going to the reactor may be precooled, e.g., about 20 centigrade degrees below the reaction temperature. For adiabetic operation, such precooling is particularly important because the capacity of such a system to produce polymer at a fixed operating temperature is approximately proportional to the change in temperature from the feed stream temperature to the reactor temperature. For a feed temperature at −5° C. and a reactor temperature of 0° C., the productivity is proportional to 5 degrees; in contrast, when the feed is at −20° C. and the reactor is at 0° C., the productivity is proportional to 20 degrees, a 4-fold increase.

It is well known that one can carry out these polymerizations in inert liquid diluents. Familiar solvents include halogenated hydrocarbons such as tetrachloroethylene (see, for example, the polymerizations illustrated in U.S. Patent 2,933,480) or in hydrocarbon solvents such as hexane, or benzene. Unfortunately halogenated solvents such as tetrachloroethylene are quite expensive and their comparatively low volatility (e.g., normal boiling points above 100° C.) causes undesirability increased operating costs for solvent recovery and recycle. Economically more attractive solvents, such as normal pentane and normal hexane, are liquid at temperatures of 0° or below, but unfortunately, fail to dissolve the copolymer product as well as desired at these temperatures; as a result there is a tendency for accumulation of copolymer slurry with consequent fouling of the lines and interruption of production. Certain hydrocarbons which display excellent solvent capacity unfortunately freeze above 0° C., e.g., benzene (M.P. 5.5° C.) or cyclohexane (M.P. 6.5° C.) and, therefore, it is not practicable to employ them in commercial processes to be operated at temperatures of 0° C. or lower since they might freeze in the feed lines and stop production; furthermore, during the polymerization they tend to obstruct the operation of the agitator in the reactor and to impede transfer of the reactor effluent.

Although both benzene and cyclohexane are each unsuitable when used alone as a solvent in the process of preparing ethylene/1,4-hexadiene copolymers with coordination catalysts at low temperatures, it has surprisingly been found that they are advantageously used as a mixture with 1,4-hexadiene to form a reaction medium for the process. The liquid reaction medium should have an initial freezing point no higher than about −15° C. These conditions are fulfilled if the reaction medium contains no more than about 55 volume per cent benzene and no more than 90 volume percent cyclohexane. For general ease of operability it is preferred that the volume ratio of benzene to cyclohexane in the reaction medium range from about 1:9 to 11:9; this corresponds to a range of from about 10 to 55 volume percent of benzene in the benezene-cyclohexane mixture.

The 1,4-hexadiene acts both as a part of the solvent system as well as a reactant in the copolymerization process. If a sufficient amount of ethylene is present to provide a practical rate, but the amount of 1,4-hexadiene present in the reaction medium is too low, the copolymer will be hard to cure with sulfur and will tend to resemble polyethylene in loss of desirable rubber-like character. If, however, the amount of 1,4-hexadiene is too high, the reaction rate will be undesirably slow. It is preferred that the reaction medium contain from about 5 to 50 volume percent 1,4-hexadiene. The copolymer product should have about 20 to 75 percent ethylene units.

FIG. 1 illustrates a melting point-composition diagram for the benzene-cyclohexane system. Curves A, B and C represent three benzene-cyclohexane systems containing zero, 10 and 20 volume percent of 1,4-hexadiene, respectively. The low point on each curve represents the eutectic point; this is the temperature at which the entire mixture solidifies irrespective of its particular ratio of benzene to cyclohexane. The term "initial freezing point" as used herein means the temperature at which the first crystals separate. For example, curve B represents a range of liquid compositions which are 10 volume percent 1,4-hexadiene and 90 volume percent benzene-cyclohexane mixture. If the latter mixture contains 30 percent benzene and 70 percent cyclohexane and is cooled to point 10 on the curve, i.e., about −40° C., the first crystals of benzene will start to appear in the liquid; thus, the initial freezing point is reached. If the liquid is further cooled, more benzene will crystallize until the temperature is at about −55° C., the eutectic point 11, at which temperature the entire medium will solidify. If the benzene-cyclohexane mixture contains about 20 percent benzene (on curve B), this is the composition of the eutectic mixture and nothing separates on cooling until the entire mixture is frozen at the eutectic point 11. As can be seen from the drawing, those liquids having greater amounts of 1,4-hexadiene have lower initial freezing points and lower eutectic points.

Although, as described above, a given liquid cooled below its initial freezing point but above its eutectic point will contain frozen particles of one of the solvents, the process can still be performed at that temperature. However, the separation of a component such as benzene will change the effective concentration of 1,4-hexadiene monomer in the copolymerization system and, therefore, the monomer unit composition of the copolymer being formed will change as the solvent component separates.

The selection of an actual composition of the liquid reaction medium will depend upon the copolymer composition desired. It is, of course, obvious that the 1,4-hexadiene serves both as a solvent and as a reactant, and the composition of the resulting copolymer will depend upon the concentration of the 1,4-hexadiene in the ternary system. Those skilled in the art can vary the volume concentration of 1,4-hexadiene in accordance with empirical experiments in order to obtain the copolymer of the desired composition; this figure having been determined, the operating temperature will then determine the relative proportions of cyclohexane and benzene needed. These can be read directly from the charts such as FIG. 1. One skilled in the art can prepare additional curves for liquids having a higher percent of 1,4-hexadiene; curves A, B and C are exemplary.

The ethylene/1,4-hexadiene copolymers are prepared in solution in the solvent system of the present invention in the presence of coordination catalysts. Any coordination catalysts which will catalyze the formation of the ethylene/1,4-hexadiene copolymer at a convenient rate in the solvent system of the present invention are recommended, e.g., those made by mixing a molar excess of diisobutyl aluminum chloride with vanadium tris(acetylacetonate) or vanadium oxybis(acetylacetonate). Those skilled in the art can determine the relative efficiency of various catalysts by routine experimentation. The preferred concentration of transition metal when vanadium catalysts are employed ranges from about 0.0002 to about 0.001 gram-atom per liter; however, higher or lower concentrations can be employed if desired. The catalyst can be premixed; alternatively, it can be formed in the reaction zone. It is sometimes preferred to introduce the catalyst after the 1,4-hexadiene has been added to the reactor but before the introduction of the highly reactive ethylene.

Since ethylene is by far the more reactive monomer used in making the copolymer, there is a tendency for the copolymer to contain an undesirably high ethylene monomer unit content; thus it is important to control the ethylene concentration in the reaction zone. When the reaction vessel has no free vapor space, i.e., the reaction system is at all times full of liquid and the pressure is high enough, the concentrations of monomers can be controlled merely by supplying the appropriate quantities of the monomers to a given volume of the reaction medium. When the reaction system has a vapor space, the monomer concentrations are controlled by their partial pressures in the vapor space and by the reaction temperature. One can use an inert gaseous diluent such as nitrogen to reduce the partial pressure of ethylene; representative feed streams have 20–50 mole percent ethylene. One reduces the ethylene partial pressure until the desired copolymer composition results.

In a typical procedure for making an ethylene/1,4-hexadiene copolymer according to the present invention, a glass reaction vessel, equipped with a glass agitator, gas inlet and outlet tubes, and openings to permit the addition of liquid reagents, is charged under nitrogen with cyclohexane, benzene, and 1,4-hexadiene. Agitation is started and the catalyst components are added. The solvent system should now be adjusted to the polymerization temperature. Nitrogen inflow is then discontinued and a gaseous monomer feed stream is introduced, either above or below the surface of the liquid system in the reactor. It is generally desired to introduce the ethylene as quickly as possible after the catalyst components have been added to the reaction. The relative amounts of gas in this gas stream are controlled by suitably calibrated rotameters which are placed in the gas feed lines ahead of a mixing T. Prior to their introduction into the reactor, the gases are purified from oxygen, carbon monoxide, carbon dioxide, water vapor, and other catalyst poisons by procedures familiar to those skilled in the art. During the reaction period, ethylene gas flow is continued and excess gas is allowed to escape through the gas-outlet tube preferably through a bubble-trap protected against backflow of air. As the copolymerization proceeds, the charge becomes increasingly viscous; it is usually convenient to stop the reaction before gas absorption is interfered with.

The copolymerization reaction is stopped by deactivating the catalyst, e.g., by adding a low molecular weight alcohol such as isopropanol to the reaction mass to deactivate the catalyst. In a representative procedure, about one volume of alcohol is introduced for 100 volumes of a reaction mixture containing 5% solids. After the catalyst has been deactivated, the copolymer can be recovered by means familiar to those skilled in the art such as by evaporative distillation, drum drying, flash drying, and coagulation with a non-solvent such as alcohol. In one representative procedure, the copolymer solution is extracted with about an equal volume of dilute (5–10%) hydrochloric acid, washed with water until acid-free and introduced onto a hot rotating drum, the solvent being subsequently flashed off to leave a deposit of copolymer which is scraped from the drum by a doctor knife. In another typical procedure, the copolymer solution is mixed with an equal volume of a low molecular weight alcohol; the copolymer thereby coagulated is filtered off and washed, in turn, with fresh alcohol and twice with acetone. The copolymer can be dried in a vacuum oven or on a rubber roll mill. A non-volatile antioxidant such as 2,2'-methylenebis(6-tert-butyl-4-methylphenol) or 4,4'-thiobis(2-tert-butyl-5-methylphenol) is often incorporated prior to the final isolation step to avoid possible oxidation and degradation of the copolymer.

The solvent system of the present invention can be utilized in continuous processes; thus monomers, catalyst, and solvent may be introduced continuously into a polymerization zone at such a rate as to provide a residence time sufficient to build up the desired concentration of the ethylene/hexadiene copolymer in the polymerization mass. The residence time may vary widely, e.g., from 5 minutes to 5 hours. In general, the residence time will be shorter as the concentrations of monomers and catalysts in the feed stream are increased. The copolymer solution continually leaving the polymerization zone is subsequently contacted with a catalyst deactivator. The copolymer is ultimately obtained after suitable purification and isolation procedures. These operations following the reaction may be continuous or batch.

The invention will now be described with reference to the following examples of preferred embodiments thereof wherein parts and percentages are by weight unless otherwise specified.

*Example I*

A catalyst is formed by addition of 1.45 ml. of diisobutyl aluminum chloride and 0.35 gram (0.001 gram-mole) of vanadium tris(acetylacetonate) to an agitated mixture of 110 ml. of 1,4-hexadiene, 668 ml. of cyclohexane, and 222 ml. of benzene at 0° C. under a protective nitrogen atmosphere. Immediately thereafter ethylene gas (2.5 liters/minute) is introduced in admixture with nitrogen (2.5 liters/minute). After the mixture has been agitated at 0° C. for 30 minutes while ethylene is continually introduced at the above-described rate, the catalyst is deactivated by introduction of 2 ml. of alcohol. The reaction mixture is then washed once with 10% hydrochloric acid and twice with water. The copolymer obtained after evaporation of the solvent is further dried overnight at 50° C. in a vacuum oven. A total yield of about 40 grams of ethylene/1,4-hexadiene dipolymer is typically isolated exhibiting an inherent viscosity of about 1.4 (measured on a 0.1% by weight solution in tetrachloroethylene at 30° C.) and containing about 35% by weight 1,4-hexadiene monomer units.

In this example the liquid reaction medium contains about 67 volume percent cyclohexane, 22 volume percent benzene and 11 volume percent 1,4-hexadiene.

*Example II*

The general procedure employed in Example I is followed except as noted hereinafter.

A gas stream supplying 2.5 liters/minute of nitrogen and 2.5 liters/minute of ethylene is introduced into an agitated mixture of 117.5 ml. of 1,4-hexadiene, 221 ml. of benzene and 661 ml. of cyclohexane at 0° C. About 10 minutes later, after the mixture has become saturated with ethylene, copolymerization is started by introducing, in turn, 0.265 gram (0.001 gram-mole) of vanadium oxybis(acetylacetonate) and 1.45 ml. (0.0075 gram-mole) of diisobutyl aluminum chloride. For about 45 minutes the temperature is kept at 0° C. and ethylene and nitrogen are continually introduced at the initial rates. The catalyst is then deactivated with alcohol and the copolymer is isolated by the procedure described in Example I. A total of about 29.5 grams are typically isolated exhibiting an inherent viscosity of about 1.6 and containing about 28% total 1,4-hexadiene monomer units by infrared analysis.

In the example the liquid reaction medium contains about 66 volume percent cyclohexane, 22 volume percent benzene and 12 volume percent 1,4-hexadiene.

*Example III*

The general procedure of Example I above is repeated except as noted hereafter.

Vanadium tris(acetylacetonate) and diisobutyl aluminum chloride are introduced into an agitated mixture of 176 ml. of 1,4-hexadiene, 206 ml. of benzene and 618 ml. of cyclohexane at −20° C. Immediately thereafter, the ethylene nitrogen gas mixture is introduced. After about 25 minutes, the yield of ethylene/1,4-hexadiene copolymer typically amounts to about 7.4 grams. The above reaction is very slow. After about 25 minutes, if the mixture is allowed to warm to 0° C. over a 10 minute period and is thereafter run for about 25 more minutes at 0° C., the total yield is typically about 40.5 grams, indicating that at the higher temperature about 33 grams of copolymer is formed.

In this example the liquid reaction medium contains about 61.8 volume percent cyclohexane, 20.6 volume percent benzene and 17.6 volume percent 1,4-hexadiene.

*Example IV*

The reaction system is a 1-liter glass resin flask equipped with a mechanical stirrer, a thermometer, a gas inlet tube, a gas outlet tube, and a liquid inlet tube covered with a rubber serum cap. This apparatus is flame-dried and allowed to cool under a stream of purified nitrogen which is maintained during subsequent operation until ethylene is introduced.

A mixture is prepared containing 75% by volume cyclohexane and 25% by volume benzene. A 328.5 ml. portion of this blend and 171.5 ml. of 1,4-hexadiene are introduced into the reaction flask and thereafter sparged with purified nitrogen while rapidly stirred. After external cooling is applied and the temperature is adjusted to about 0° C., the nitrogen feed is stopped and ethylene is introduced at the rate of about 3.2 liters per minute into the reaction vessel below the agitated liquid surface. Continued inflow of this monomer feed stream saturates the mixed solvent; excess ethylene is allowed to escape through the gas outlet tube which is attached to suitable traps to prevent inflow of air into the apparatus.

The coordination catalyst is formed in situ by addition, in turn, of 5 ml. (0.00025 gram-mole) of a 0.05 M benzene solution of vanadium tris(acetylacetonate), 0.00004 gram-mole of zinc bis(thenoyl trifluoroacetonate), and 1.5 ml. (0.0015 gram-mole) of a 1 M solution of diisobutyl aluminum chloride in benzene to the monomer mixture. The reaction mixture is agitated thereafter for about 15 minutes at 0° C. while ethylene is continuously introduced at the previously-described rate. Then the reaction is stopped by addition of 10 ml. of isopropyl alcohol to deactivate the catalyst. After the copolymer solution is poured into about 500 ml. of isopropyl alcohol, the coagulated copolymer is filtered off and washed with isopropanol in a Blendor, and air-dried. The yield of ethylene/1,4-hexadiene copolymer is typically about 29 grams. This product displays an inherent viscosity of about 1.22 (measured at 30° C. on a 0.1% solution of the copolymer in tetrachloroethylene) and analyzes for about 36% by weight 1,4-hexadiene monomer units.

In this example the liquid reaction medium contains about 49 volume percent cyclohexane, 34.5 volume percent 1,4-hexadiene and 16.5 volume percent benzene.

The ethylene/1,4-hexadiene copolymer can be cured with sulfur in a wide variety of ways. Various procedures and modifications of sulfur curing are more particularly described in Encyclopedia of Chemical Technology, Kirk and Othmer, published by Inter-Science Encyclopedia, Inc., New York, 1953, 11 pages 892–927; Principles of High-Polymer Theory and Practice, Schmidt and Marlies, published by McGraw-Hill book Co., New York, 1948, pages 556–566; Chemistry and Technology of Rubber, Davis and Blake, published by Reinhold Publishing Corp., New York, 1937, Chapter 6; Introduction to Rubber Technology, edited by M. Morton, Reinhold Publishing Corp., New York, 1959, pages 93–129; The Applied Science of Rubber, edited by W. J. S. Naunton, Edward Arnold, Ltd., London, 1961, pages 346–413, 992–1099.

Vulcanization is accomplished by heating the compounded copolymer or a compounded blend of the copolymer with other elastomers (usually in a mold) at a temperature ranging about 100° C. to 160° C. for a period of time ranging from about 10–90 minutes. Those skilled in the art can determine the best time and temperature to use by empirical experiments. The state of cure is best determined by the value of the modulus at 300% extension at 25° C. and the compression set at elevated temperatures, for example at 70 to 100° C.; in addition to curing additives, the copolymers can be loaded with conventional fillers such as carbon black or clay and pigments may be added. If desired, the copolymer can be oil extended.

The solvent system of the present invention not only is advantageous from the standpoint of operating convenience at low temperatures but it also facilitates the solvent recovery. The boiling point of 1,4-hexadiene is sufficiently lower than that of cyclohexane and benzene, that 1,4-hexadiene can be separated from the other two components by distillation. Since cyclohexane and benzene boil within about two degrees of each other, they can be treated together as a single solvent for purification and recycling to the reaction zone. This ease of separation and handling is a great advantage in the production of the copolymers.

What is claimed is:

1. In a process for the preparation of an ethylene/1,4-hexadiene copolymer which comprises reacting ethylene with 1,4-hexadiene in the presence of a coordination catalyst at 0° C. or below, the improvement which consists in conducting said reaction in a liquid reaction medium consisting of 1,4-hexadiene, cyclohexane and benzene, said reaction medium containing no more than about 55 volume percent benzene and no more than about 90 volume percent cyclohexane, the ratio of benzene to cyclohexane in said liquid reaction medium ranging from about 1:9 to 11:9.

2. A process as defined in claim 1 wherein the amount of 1,4-hexadiene in said liquid reaction medium ranges from about 5 to 50 volume percent.

3. In a process for the preparation of an ethylene/1,4-hexadiene copolymer in a liquid reaction medium which comprises reacting ethylene with 1,4-hexadiene in the presence of a coordination catalyst at 0° C. or below, the improvement which consists in precooling said liquid reaction medium at least 20 centigrade degrees below the desired reaction temperature before introduction into the reaction zone, said medium consisting of 1,4-hexadiene, cyclohexane and benzene and having an initial freezing point no higher than about −15° C. and containing no more than about 55 volume percent benzene and no more than about 90 volume percent cyclohexane, the ratio of benzene to cyclohexane in said liquid reaction medium ranging from about 1:9 to 11:9.

4. A process as defined in claim 3 wherein the amount of 1,4-hexadiene in said liquid reaction medium ranges from about 5 to 50 volume percent.

References Cited by the Examiner
UNITED STATES PATENTS 2,945,367    9/1960    Vandenberg _____ 260—93.7

FOREIGN PATENTS 1,310,100    10/1962    France.

OTHER REFERENCES

Glasstone, Textbook of Physical Chemistry, 2d ed., p. 745–748; April 1946; QD 453 G55 1946 Wp 2.

JOSEPH L. SCHOFER, *Primary Examiner.*

F. L. DENSON, *Assistant Examiner.*